(12) United States Patent
Lauer (10) Patent No.: US 7,463,396 B2
(45) Date of Patent: Dec. 9, 2008

(54) CONFOCAL OPTICAL SCANNING DEVICE

(76) Inventor: Vincent Lauer, 1 villa de Beauté, Nogent sur Marne (FR) 94130

(*) Notice: Subject to any disclaimer, the term of this patent is extended or adjusted under 35 U.S.C. 154(b) by 0 days.

(21) Appl. No.: 10/505,124

(22) PCT Filed: Mar. 4, 2003

(86) PCT No.: PCT/FR03/00699

§ 371 (c)(1),
(2), (4) Date: Aug. 18, 2004

(87) PCT Pub. No.: WO03/075070

PCT Pub. Date: Sep. 12, 2003

(65) Prior Publication Data

US 2006/0245022 A1    Nov. 2, 2006

(30) Foreign Application Priority Data

Mar. 4, 2002    (FR) .................................. 02 02740

(51) Int. Cl.
*G02B 26/08* (2006.01)
*G02B 21/18* (2006.01)

(52) U.S. Cl. .................. 359/226; 359/216; 359/214; 359/212; 359/372; 359/389

(58) Field of Classification Search ........................ None
See application file for complete search history.

(56) References Cited

U.S. PATENT DOCUMENTS 4,170,398 A    10/1979 Koester
5,153,428 A *  10/1992 Ellis ........................... 250/234

FOREIGN PATENT DOCUMENTS

WO    WO 01/22146    *  3/2001

OTHER PUBLICATIONS

G.J. Brakenhoff & K.Visscher, "Novel Confocal imaging and visualization techniques", 11353 Proceedings of the Royal Microscopical Society Conference (Micro 90) Jul. 2-6, 1990, London, Bristol, UK.
G.J. Brakenhoff & K.Visscher, "Confocal Imaging with bilateral scanning and array detectors", Journal of Microscopy vol. 165 Pt1, Jan. 1992, pp. 139-146, The Royal Microscopical Society, UK.
G.J. Brakenhoff & K.Visscher, "Imaging modes for bilateral confocal scanning microscopy", Journal of Microscopy(Oxford) vol. 171, Pt 1, Jul. 1993, pp. 17-26, The Royal Microscopical Society, UK.
G.M. Svishchev, "Microscope for the study of transparent light-scattering objects in incident light", Optics and Spectroscopy vol. 26 pp. 171-172, 1969, St Petersburg, Russia.

* cited by examiner

*Primary Examiner*—James Phan (57) ABSTRACT

The invention concerns a confocal optical scanning device comprising a mobile scanning mirror, reflection on one side 101(*b*) compensating reflection on the opposite side 101(*a*) after passing through an array of microscopic holes. The invention is applicable to rapid 3D and 2D microscopy, in biology and in the study of materials.

4 Claims, 7 Drawing Sheets

CONFOCAL OPTICAL SCANNING DEVICE

The invention concerns an optical scanning device intended to simultaneously scan an observed plane and an image plane.

Patent number PCT/FR01/02890 describes a scanning device intended to simultaneously scan an observed plane and an image plane.

Two types of scanning device are described in this document:

devices using an array of micromirrors for filtering the light beam and using only one face of a movable mirror, devices using one or more microscopic holes as a spatial filtering device, in order to filter the light beam, and using the two opposite faces of a movable mirror.

The scanning devices in the second category use a movable mirror having:

an object face directed towards the observed object (and therefore towards the microscope lens), which makes it possible to move, in the plane of the array of microscopic holes, the geometric image of a fixed point of the observed object, an image face directed towards the detection device (for example the camera) which makes it possible to bring the geometrical image of a fixed point of the observed image back to a fixed point of the detection device.

The object face therefore allows for the scanning itself, and the image face allows compensation of this scanning.

FIGS. 1 to 5 give a better understanding of the compensation mechanism. FIG. 1(a) shows a notional configuration having simple symmetry properties. The beam arriving horizontally on the object face 01 is reflected upwards. The beam arriving vertically on the image face 02 is reflected to the right. FIG. 11(b) shows the scanning and compensation principle used in the prior art. The beam arrives horizontally on the object face and is reflected upwards. The beam arrives horizontally on the image face and is reflected downwards.

Figure 1A:
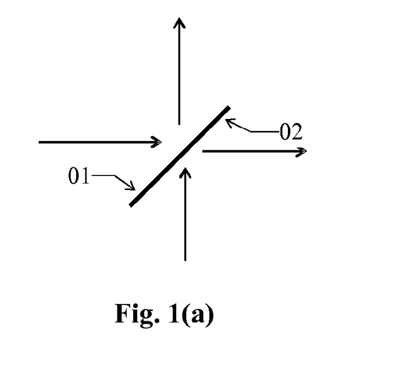
FIGS. 1(a), 2(a), 3(a), 4(a) show a symmetrical configuration making it possible, by reversing the direction of the beam, to obtain FIGS. 11(b), 2(b), 3(b), 4(b), which illustrate the compensation principle used in the state of the art.
Figure 1B:
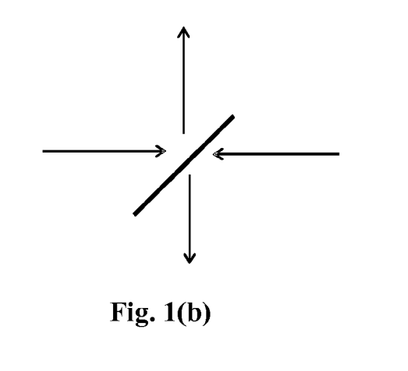
FIG. 1 shows the central portion of the movable mirror.
Figure 2A:
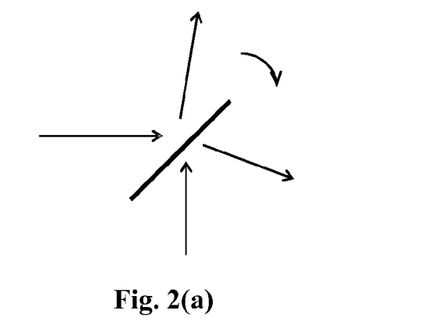
Figure 2B:
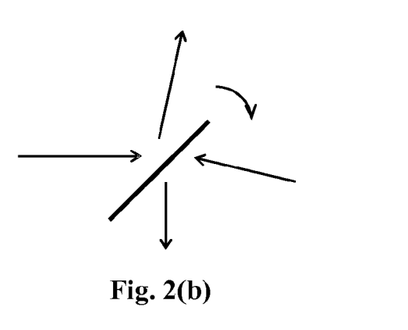
FIG. 2 shows the effect of a rotation movement about an axis orthogonal to the plane of the figure.

If the movable mirror undergoes a rotation about an axis orthogonal to the plane of the figure, as indicated in FIG. 2, the reflected beams in FIG. 1(a) each undergo a rotation in the direction indicated by FIG. 2(a). By reversing the direction of the beams, there is derived therefrom the direction which the incident beams must have on the image face of the movable mirror, in the scanning and compensation system of FIG. 1(b), for the direction of the output beam to remain constant. This direction is shown in FIG. 2(b). The lens and mirror system restoring the light beam of the object face to the image face of the movable mirror must therefore be designed so that the beam reflected by the object face and diverted towards the right of the figure reaches the image face whilst being diverted upwards.

Figure 3A:
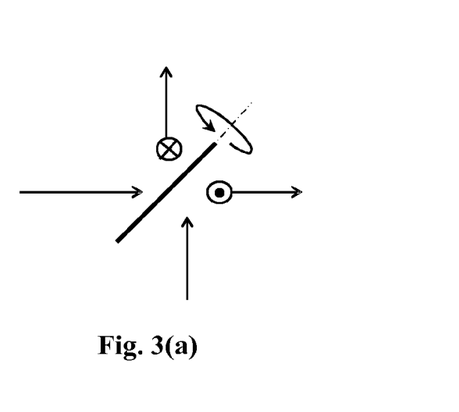
Figure 3B:
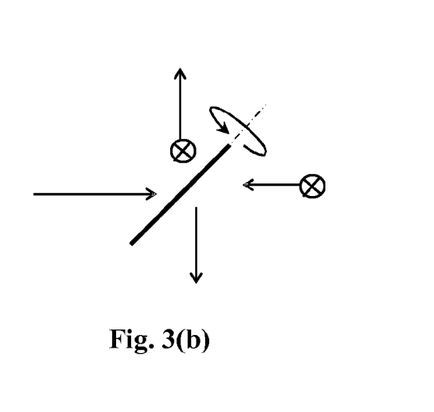
FIG. 3 shows the first-order effect of a rotation movement about an axis situated in the plane of the figure.

If the movable mirror undergoes a small rotation about an axis situated in the plane of the figure, as indicated in FIG. 3, the directions of the beams in FIGS. 2(a) and 2(b) are modified as indicated respectively in FIGS. 3(a) and 3(b). In these figures, a cross represents a beam moving away from the observer, and a dot in a circle represents a beam moving towards the observer.

However, the situation depicted in FIG. 3 is valid only to the first order. When the angles of rotation of the movable mirror become sufficiently large, a second-order phenomenon appears, which is a rotation to the right of the beam reflected by the object face. The diagrams in FIG. 3 must then be modified as indicated in FIG. 4.

Figure 4A:
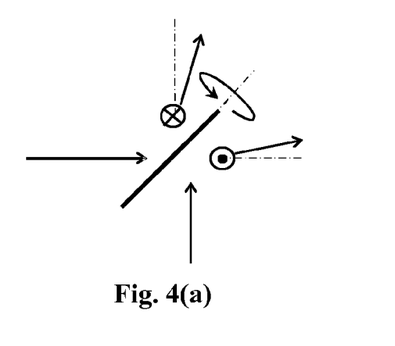
Figure 4B:
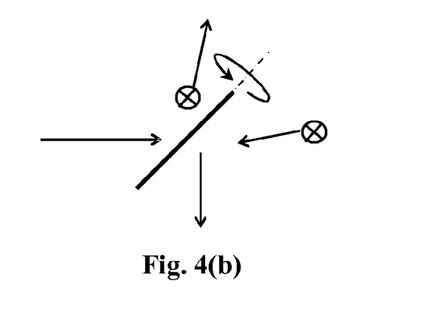
FIG. 4 shows the second-order effect of this movement.
Figure 5:
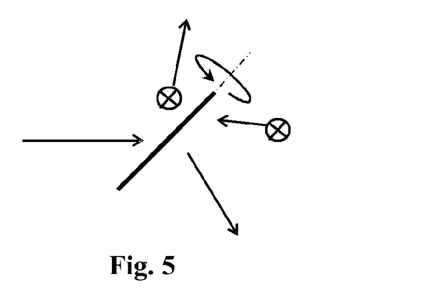
FIG. 5 shows the second-order effect of this movement when the system is configured so as to compensate for the rotations of the movable mirror to the first order.

So that compensation takes place correctly to the first order, the system of lenses and mirrors which brings the beam back from the object face towards the image face must make it possible to verify the situations in FIGS. 2(b) and 3(b). Consequently, a beam reflected by the object face as indicated in FIG. 4(a) returns to the image face as indicated in FIG. 5. However in order to start off again in a constant direction it should return as indicated in FIG. 4(b). There is an incompatibility between the first-order compensation of all the movements of the mirror and the second-order compensation of the rotation movements about an axis situated in the plane of the figure. The system being designed so that the compensation takes place correctly to the first order, the second-order deviation is not compensated for but amplified, as indicated in FIG. 5. Consequently the image obtained on the detector is affected by a second-order disturbance with respect to the magnitude of the rotary movements of the mirror about an axis situated in the plane of the figure.

Patent application WO 0122146A shows on its FIG. 3 a device which solves this problem. A simplified version of this device is also shown on FIG. 7 of the present application. An un-folded representation of the device of FIG. 7 is shown on FIG. 8 and the redirection mirrors alone have been shown on FIG. 9.

Figure 7:
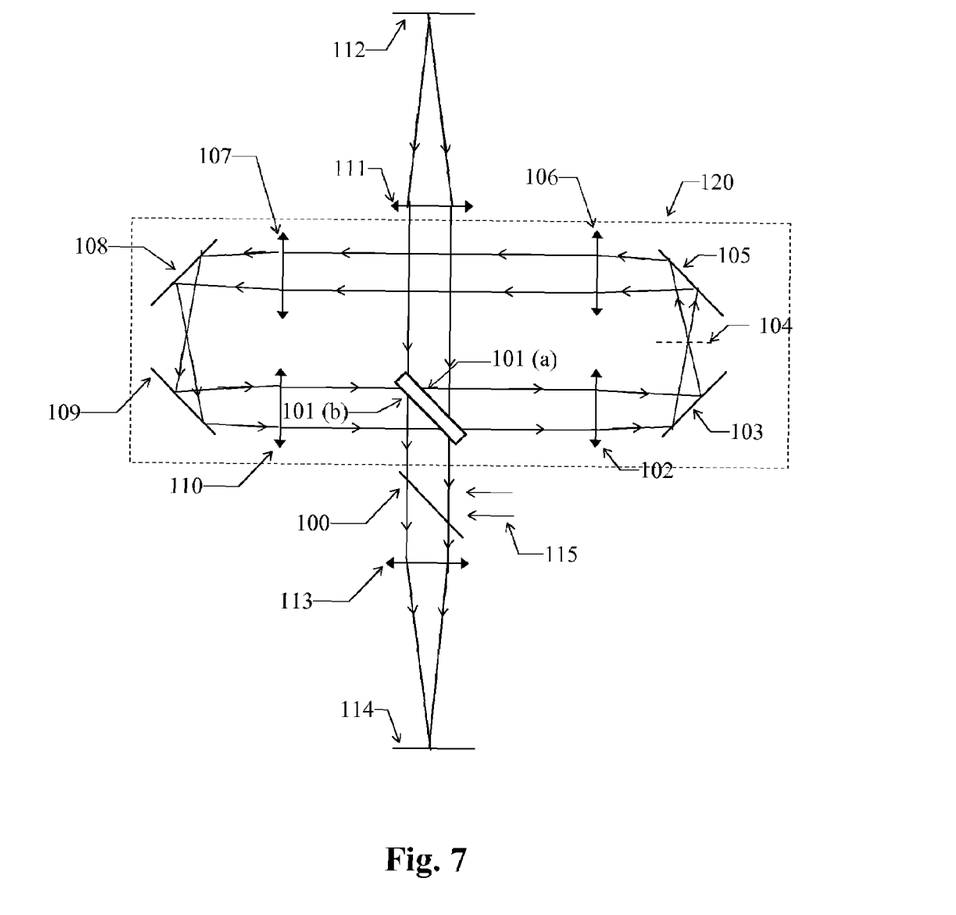
FIG. 7 shows a simplified drawing of a prior art scanning device.

The scanning device 120 of FIG. 7 comprises:

a rotationally mobile mirror 101 comprising an object face 101(a) and an image face 101(b), the image face being opposed to the object face of the rotationally mobile mirror, an optical path connecting the object face of the rotationally mobile mirror to the image face of the rotationally mobile mirror, at least one microscopic hole 104 placed in an intermediate image plane on the optical path, a first group of at least one control lens, made up of all lenses 102 placed in the optical path between the object face 101(a) of the rotationally mobile mirror and the microscopic hole 104, a second group of at least one control lens, made up of all lenses 106, 107, 108 placed in the optical path between the microscopic hole 104 and the image face of the rotationally mobile mirror, four redirection mirrors 103, 105, 108, 109 for folding the optical path, to allow the optical path to connect the object face 101(a) of the rotationally mobile mirror to the image face 101(b) of the rotationally mobile mirror, FIG. 7 also shows an object 112. Light coming from this object passes trough lens 111 and reaches the scanning device 120. It also shows an image plane 114 reached by light coming from the scanning device 120 and having passed through lens 113. An optional beamsplitter 100 can be used to direct illumination light 115 through the scanner towards the object 112.

Figures 6A, 6B, 6C:
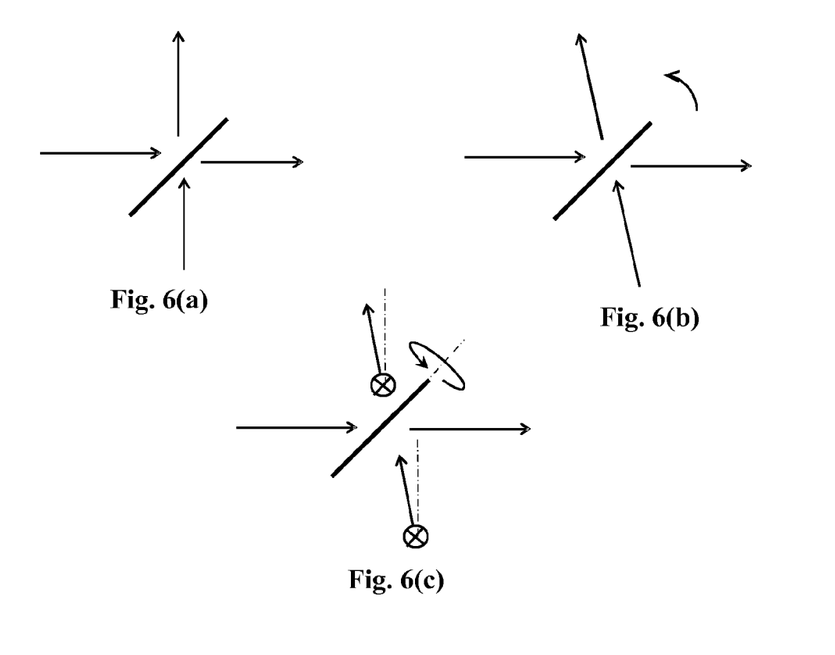
FIG. 6(a) shows a central position of the movable mirror.
FIG. 6(b) shows the effect of a rotation about an axis orthogonal to the plane of the Figure.
FIG. 6(c) shows the effect of a rotation about an axis situated in the plane of the figure.

The problem is thus resolved in the case illustrated by FIG. 7 by means of a scanning system in which the beam incident on the object face is brought back the image face in the manner indicated in FIG. 6(a), namely that the beam reflected by the object face returns to the image face with the same axis and the same direction as just after its reflection by the object face, and the beam leaving the movable mirror after reflection on the image face has the same axis and the same direction as the incident beam on the movable mirror before reflection on the object face. The compensation for the movements of the movable mirror then takes place as indicated in FIGS. 6(b) and (c) and there is no incompatibility between the first-order compensation and the second-order compensation. The system of lenses and mirrors making it possible to bring the beam reflected by the object face back towards the image face, in the manner indicated by FIG. 6(c), also brings the beam reflected by the object face of FIG. 6(b) back towards the image face, as indicated by FIG. 6(b). In general terms it is possible to show that the compensation is perfect at all orders.

In the case where the movable mirror has two distinct axes of rotation, this configuration makes it possible to use high angles of rotation about two axes. In the case where the movable mirror has only one axis of rotation, this configuration improves the robustness of the system with respect to the imprecisions in positioning of the mirror and allows the use of the most practical axis of rotation having regard to the space requirements. In general terms, this configuration makes it possible to enlarge the useful angles of rotation of the movable mirror. However, these angles of rotation remain limited by the aberrations of the lenses and by the fact that the beam must not depart from a trajectory causing it to pass through the control lenses, the redirection mirrors and the array of microscopic holes.

Figure 8:
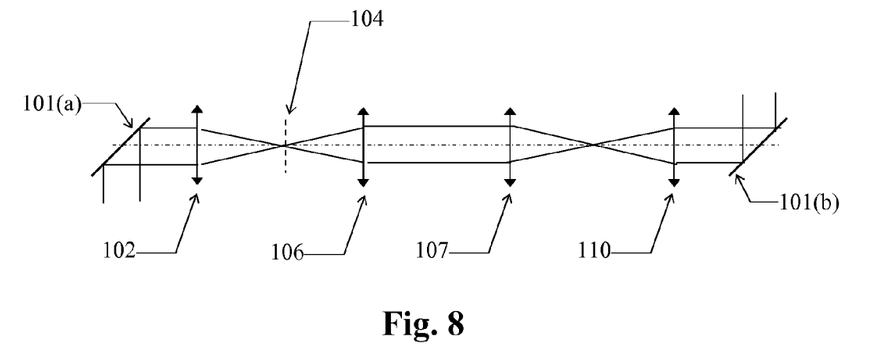
FIG. 8 shows the optical path used in FIG. 7 but without the folding due to the redirection mirrors.

FIG. 8 illustrates the optical path of the scanning and compensation assembly of FIG. 7, according to an "unfolded" representation not taking into account the mirros. The beam issuing from the object face 101(a) of the galvanometric mirror passes successively through the lens 102, the array of microscopic holes 104, the lens 106, the lens 107 and the lens 110, and returns to the image face 101(b) of the galvanometric mirror. The diagram in FIG. 7 is obtained by folding this optical path by means of the redirection mirrors 103, 105, 108, 109. The positions of these mirrors and therefore the characteristics of the folding of the optical path can be characterized by the coordinates of the points of these mirrors which are situated on the optical axis. These mirrors and points have been depicted in FIG. 9. Point A is the centre of the object face 101(a) of the galvanometric mirror, situated on the optical axis 121. Point B is the point on the mirror 103 which is on the optical axis 121. Likewise, points C, D, E, F are the points on the mirrors successively reached by the beam and situated on the optical axis. In the present case the points A, B, C, D, E, F are coplanar.

SUMMARY OF THE INVENTION

In the prior art device of FIG. 7 the second group of lenses is made of three lens sub-groups 106, 107, 108. Using less lenses would minimize the size of the device and optimize its transmissivity. The inventiion consists in a device having optical properties similar to the device of FIG. 7, but in which the size of the device is minimized and its transmissivity is maximized.

The second group of lenses of FIG. 7 is made up of a positive focal length lens 108 and an inverting doublet 106, 107. This second group of lenses has a negative focal length. In order to minimize the number of optical elements, in the invention both the first and the second groups of lenses have a positive focal length.

Figure 9:
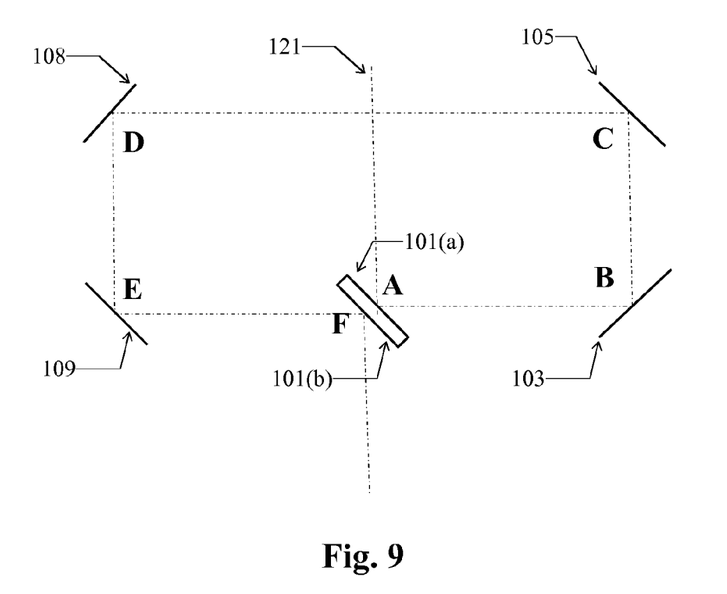
FIG. 9 shows the principle of redirection by the mirrors and defines the points A, B, C, D, E, F characterizing this redirection.

However, a simple folding configuration like the one illustrated in FIG. 9 is not suitable with first and second groups of control lenses having positive focal lengths, because it does not allow the return of the beam to the galvanometric mirror in the orientation illustrated by FIGS. 6(b) and 6(c), which is essential to correct compensation.

In the invention, this problem is solved by adapting the orientation of the mirrors so that a beam incident on the object face with a fixed direction leaves the image face with a fixed direction independent of the position of the rotationally mobile mirror, and so that a beam coming from the object face and incident on the image face has the same direction as the same beam when it leaves the object face towards the image face.

In the invention a four-mirror configuration can be used, but then the points A, B, C, D, E, F defined above cannot be in the same plane like on FIG. 9. In a preferred embodiment of the invention they satisfy the following condition:

$$(AB \times BC, BC \times CD)_{BC} + (BC \times CD, CD \times DE)_{DC} + (CD \times DE, DE \times EF)_{DE} + (DE \times EF, EF \times BC)_{FE} = \pi$$

where $(UV \times VX, VX \times XY)_{VX}$ represents the angle between the vector product $(UV \times VX)$ of the vectors UV and VX, and the vector product $(VX \times XY)$ of the vectors VX and XY, oriented by the vector VX, for any set of points U, V, X, Y, and where:

A is the point on the object face of the movable mirror which is situated on the optical axis, B is the point on the first redirection mirror reached by a beam directed from the object face to the image face of the movable mirror, which is situated on the optical axis, C is the point on the second redirection mirror reached by a beam directed from the object face to the image face of the movable mirror, which is situated on the optical axis, D is the point on the third redirection mirror reached by a beam directed from the object face to the image face of the movable mirror, which is situated on the optical axis, E is the point on the fourth redirection mirror reached by a beam directed from the object face to the image face of the movable mirror, which is situated on the optical axis, F is the point on the image face of the movable mirror which is situated on the optical axis.

This condition implies in particular that the points A, B, C, D, E, F are non-coplanar.

BRIEF DESCRIPTION OF THE DRAWINGS

FIGS. 1 to 5 serve to support the explanation of a default of the microscopes according to the state of the art.

FIG. 6 shows the principle used according to the prior art for effecting the compensation of the scanning movement.

FIGS. 10 to 15 relate to an embodiment of the invention.

FIGS. 12 to 15 relate to a particular example of this embodiment, completely dimensioned.

DETAILED DESCRIPTION OF A PREFERRED EMBODIMENT

Figure 10:
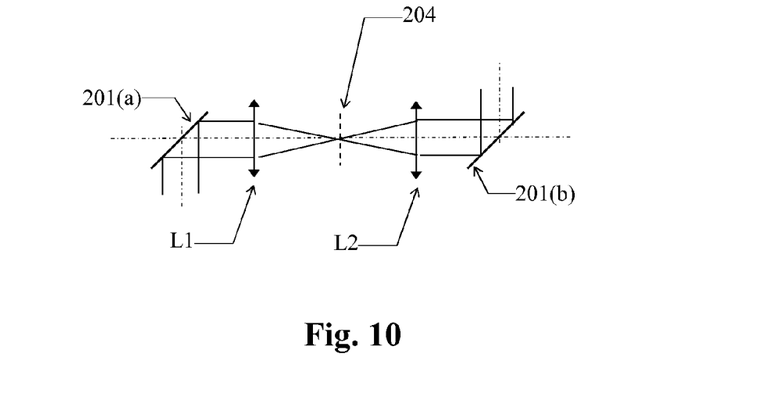
FIG. 10 shows the "unfolded" optical path without the redirection mirrors.

FIG. 10 shows the "unfolded" representation of this embodiment, according to the same principle as FIG. 8. The beam reflected by the object face 201(a) of the galvanometric mirror passes through the lens L1, the array of microscopic holes 204 and the lens L2, and arrives at the image face 201(1b) of the galvanometric mirror. The lenses L1 and L2 are identical and have in each case a focal plane on the array 204 and a focal plane on one of the faces of the galvanometric mirror. The optical path is folded by means of 4 mirrors as in the previous case. However, a simple folding configuration like the one illustrated in FIG. 9 is not suitable since it does not allow the return of the beam to the galvanometric mirror in the orientation illustrated by FIGS. 6(b) and 6(c), which is essential to correct compensation.

For there to be correct compensation of the scanning in this case, the folding must be carried out in a more appropriate manner. The condition which must be satisfied for the folding to take place correctly is as follows:

$$(AB \times BC, BC \times CD)_{BC} + (BC \times CD, CD \times DE)_{DC} + (CD \times DE, DE \times EF)_{DE} + (DE \times EF, EF \times BC)_{FE} = \pi$$

where for example $(AB \times BC, BC \times CD)_{BC}$ represents the angle between the vector products $(AB \times BC)$ and $(BC \times CD)$, oriented by the vector BC.

Figure 11:
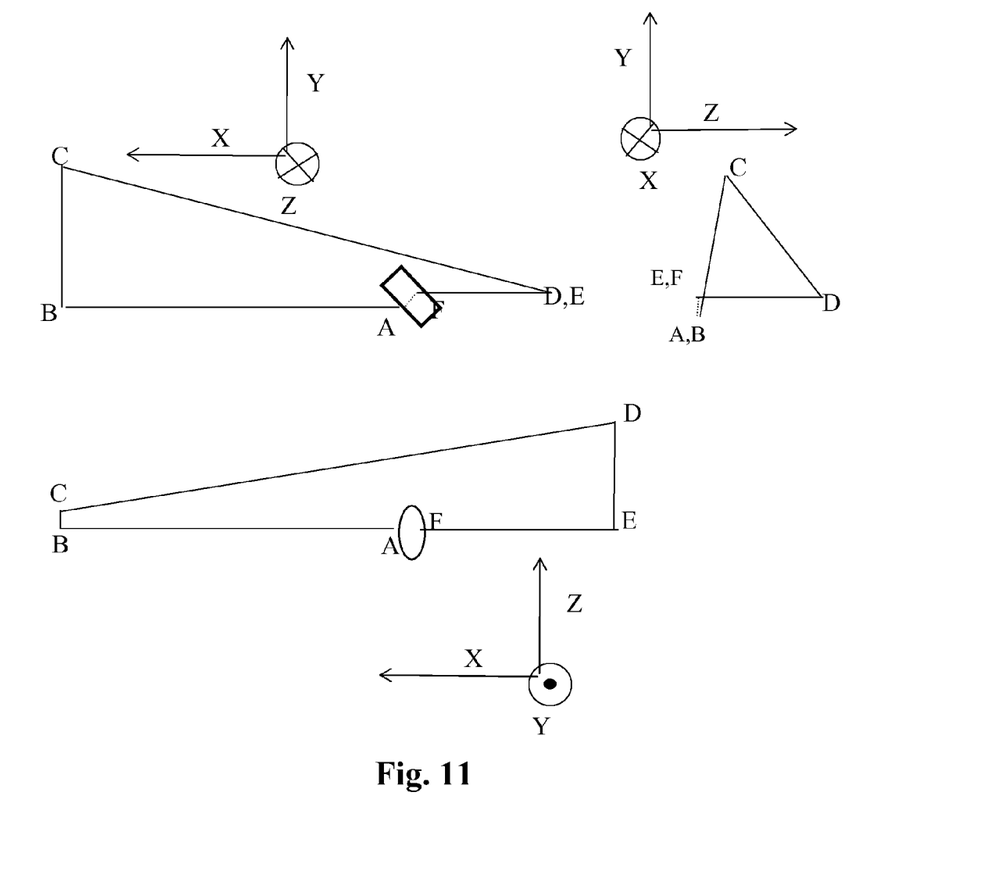
FIG. 11 shows an example of a position in 3D space of the points A, B, C, D, E, F which define the folding.

This condition cannot be satisfied if the points A, B, C, D, E, F are coplanar. It is therefore necessary to use an optical path in which the elements of the scanning device are not all in the same plane. For example, the path ABCDEF can be of the type illustrated in FIG. 11, in several views, with an indication of reference frames. In general terms, this path is characterized by the three-dimensional coordinates of the points A, B, C, D, E, F. The orientations of the mirrors are derived therefrom. For example, the mirror passing through the point B is oriented so that the normal to the mirror is the bisector of the angle (BA, BC). The other mirrors are likewise oriented so that the optical axis does indeed fold along the path ABCDEF. A system satisfying this condition can be calculated, for example using the "target value" function of a spreadsheet to adjust the position of the points so as to obtain the appropriate value of the sum of angles hereinabove whilst maintaining the total length of the optical path at the value imposed by a choice of lenses.

Figure 12:
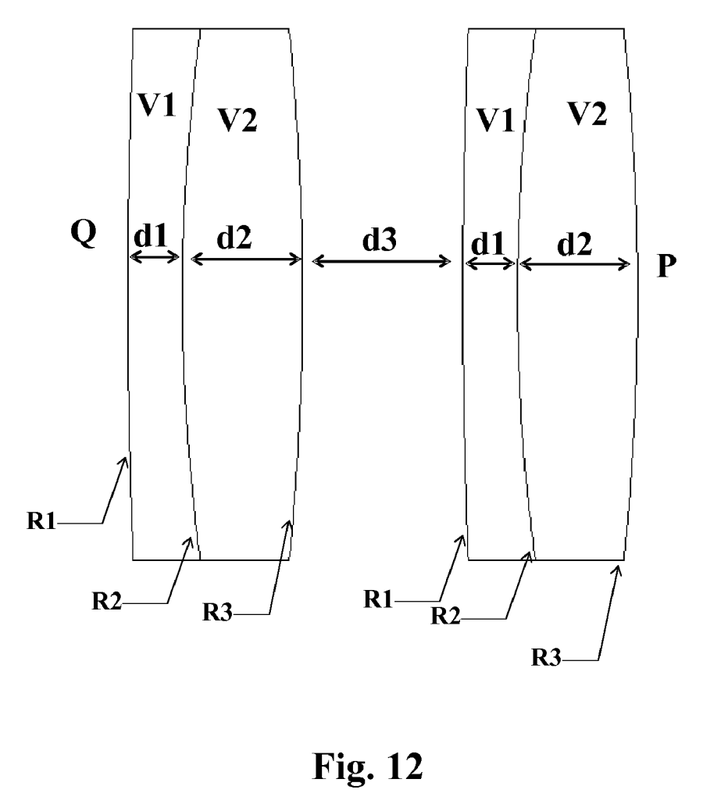
FIG. 12 shows a lens used, composed of two identical achromatic lenses.

A particular example is shown in FIGS. 12 to 15. FIG. 12 illustrates the lens used. It is composed of two identical achromatic lenses. The points P and Q are used to characterize the position of the lens. Lenses L1 and L2 being identical, the point P will be denoted P1, P2 depending on whether it is a case of the lens L1 or L2, and likewise the point Q will be denoted Q1, Q2 depending on whether it is a case of the lens L1 or L2.

The characteristics of this lens are:

| | |
|---|---|
| Glass V1 | SF10; index 1.73366143 (at 550 nm) |
| Glass V2 | BAK4, index n = 1.57099293 (at 550 nm) |
| R1 | 483.71 mm |
| d1 | 4.1 mm |
| R2 | 148.27 mm |
| d2 | 9 mm |
| R3 | −194.96 mm |
| d3 | 12 mm |
| PQ | 38.2 mm |

Figure 13:
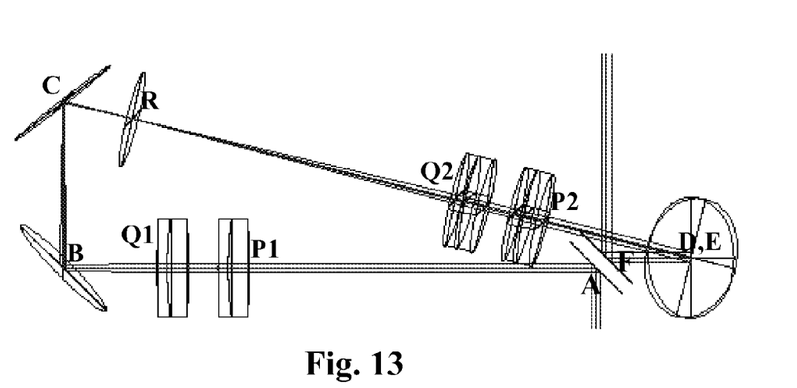
FIGS. 13 to 15 show several views of the device, FIG. 15 being a perspective view.
Figure 14:
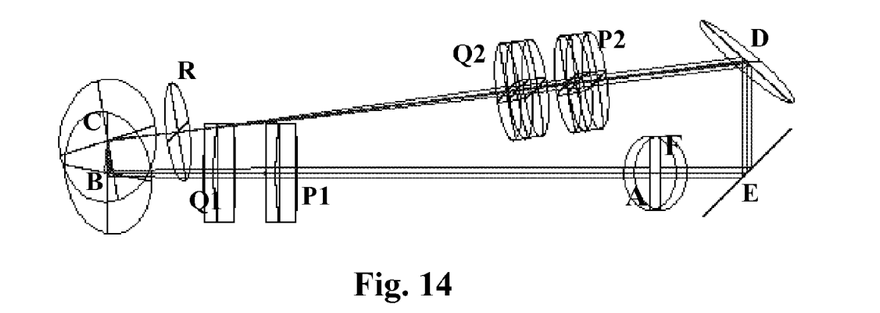
Figure 15:
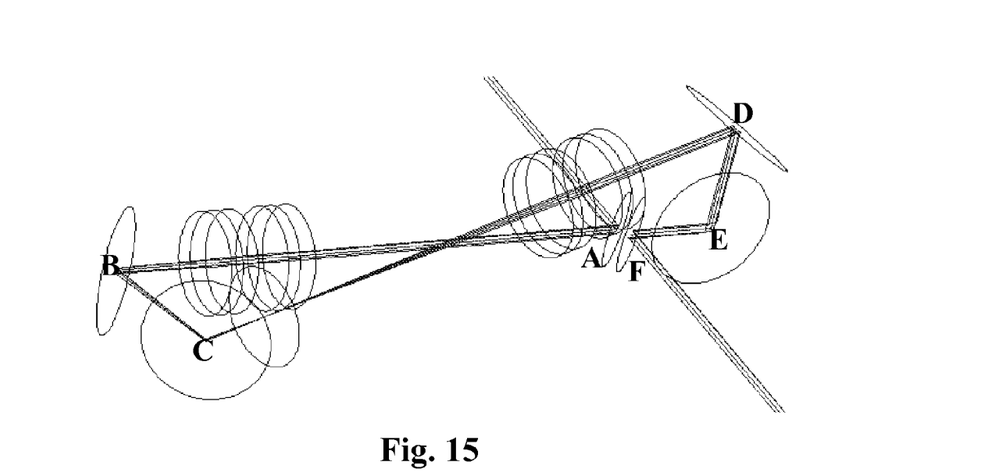

The thickness of the galvanometric mirror used is 6 mm. FIGS. 13 to 15 illustrate the optical path of the beam in different views. The configuration is characterized by the coordinates of the points A, B, C, D, E, F in an orthonormal reference frame, in mm:

| Point/coordinate | A | B | C | D | E | F |
|---|---|---|---|---|---|---|
| x | 0.0000 | 219.9341 | 219.9341 | −39.2426 | −39.2426 | −4.2426 |
| y | 0.0000 | 0.0000 | 68.7576 | 4.2426 | 4.2426 | 4.2426 |
| z | 0.0000 | 0.0000 | 13.1298 | 45.0000 | 0.0000 | 0.0000 |

The equation:

$$(AB \times BC, BC \times CD)_{BC} + (BC \times CD, CD \times DE)_{DC} + (CD \times DE, DE \times EF)_{DE} + (DE \times EF, EF \times BC)_{FE} = \pi$$

is satisfied.

The distances along the optical axis are as follows in nun, the letter R designating the position of the array of microscopic holes 204:

| | |
|---|---|
| AP1 | 142.881 |
| P1Q1 | 38.2 |
| Q1B | 38.852 |
| BC | 70 |
| CR | 29.523 |
| RQ2 | 138.375 |
| Q2P2 | 38.2 |
| P2D | 62.882 |
| DE | 45 |
| EF | 35 |

FIGS. 13 to 15 illustrate this example embodiment in several views. In the perspective view of FIG. 15, only the folding points A, B, C, D, E, F have been indicated. In the other two views all the points in the above table have been indicated. The object and image lenses (the equivalents of the lenses 111 and 114 of FIG. 7) have not been shown and therefore only the scanning and compensation assembly has been shown, equivalent to the assembly 120 in FIG. 7. In the complete scanning device, the object and image lenses must be added in the same way as in FIG. 7. The scanning and compensation assembly depicted in FIGS. 13 and 15 can be fixed to a single frame directly connected to the floor, the object and image lenses then being fixed to the same optical table as the microscope used.

INDUSTRIAL APPLICATIONS

The present scanning device can be used for confocal scanning microscopy, for example for cell biology.

What is claimed is:
1. Device for confocal optical scanning comprising:
   a rotationally mobile mirror comprising an object face and an image face, the image face being opposed to the object face of the rotationally mobile mirror,
   an optical path connecting the object face of the rotationally mobile mirror to the image face of the rotationally mobile mirror,
   at least one microscopic hole placed in an intermediate image plane on the optical path, a first group of at least one control lens, made up of all lenses placed in the optical path between the object face of the rotationally mobile mirror and the microscopic hole, said first group having a positive focal length, a second group of at least one control lens, made up of all lenses placed in the optical path between the microscopic hole and the image face of the rotationally mobile mirror, said second group having a positive focal length, four redirection mirrors for folding the optical path, to allow the optical path to correct the object face of the rotationally mobile mirror to the image face of the rotationally mobile mirror, the orientation of the redirection mirrors being adapted so that a beam incident on the object face with a fixed direction leaves the image face with a fixed direction independent of the position of the rotationally mobile mirror, and so that a beam coming from the object face and incident on the image face has the same direction as the same beam when it leaves the object face towards the image face, comprising no other elements for folding the optical path than said four redirection mirrors, wherein the points A, B, C, D, E, F are not in a same plane, wherein:

A is the point on the object face of the movable mirror which is situated on the optical axis, B is the point on the first redirection mirror reached by a beam directed from the object face to the image face of the movable mirror, which is situated on the optical axis, C is the point on the second redirection mirror reached by a beam directed from the object face to the image face of the movable mirror, which is situated on the optical axis, D is the point on the third redirection mirror reached by a beam directed from the object face to the image face of the movable mirror, which is situated on the optical axis, E is the point on the fourth redirection mirror reached by a beam directed from the object face to the image face of the movable mirror, which is situated on the optical axis, F is the point on the image face of the movable mirror which is situated on the optical axis.

2. Device according to claim 1, wherein $$(AB \times BC, BC \times CD)_{BC} + (BC \times CD, CD \times DE)_{DC} + (CD \times DE, DE \times EF)_{DE} + (DE \times EF, EF \times BC)_{FE} = \pi$$

wherein $(UV \times VX, VX \times XY)_{VX}$ represents the angle between the vector product $(UV \times VX)$ of the vectors UV and VX, and the vector product $(VX \times XY)$ of the vectors VX and XY, oriented by the vector VX.

3. Confocal optical scanning device comprising:

a rotationally mobile mirror comprising an object face and an image face, the image face being opposed to the object face of the rotationally mobile mirror, an optical path between the object face of the rotationally mobile mirror and the image face of the rotationally mobile mirror, at least one microscopic hole placed in an intermediate image plane on the optical path, four redirection mirrors for folding the optical path, to allow the optical path to go from the object face of the rotationally mobile mirror to the image face of the rotationally mobile mirror, wherein the points A, B, C, D, E, F are not in a same plane, wherein:

A is the point on the object face of the movable mirror which is situated on the optical axis, B is the point on the first redirection mirror reached by a beam directed from the object face to the image face of the movable mirror, which is situated on the optical axis, C is the point on the second redirection mirror reached by a beam directed from the object face to the image face of the movable mirror, which is situated on the optical axis, D is the point on the third redirection mirror reached by a beam directed from the object face to the image face of the movable mirror, which is situated on the optical axis, E is the point on the fourth redirection mirror reached by a beam directed from the object face to the image face of the moveable mirror, which is situated on the optical axis, F is the point on the image face of the movable mirror which is situated on the optical axis.

4. Device according to claim 3, wherein $$(AB \times BC, BC \times CD)_{BC} + (BC \times CD, CD \times DE)_{DC} + (CD \times DE, DE \times EF)_{DE} + (DE \times EF, EF \times BC)_{FE} = \pi$$

wherein $(UV \times VX, VX \times XY)_{VX}$ represents the angle between the vector product $(UV \times VX)$ of the vectors UV and VX, and the vector product $(VX \times XY)$ of the vectors VX and XY, oriented by the vector VX.

* * * * *